Feb. 6, 1934.  E. B. HAMILTON  1,946,318
EDUCATIONAL GAME DEVICE
Filed April 10, 1931

Inventor
Eugene B. Hamilton
by Mitchell, Chadwick & Kent
Attorneys

Patented Feb. 6, 1934

1,946,318

UNITED STATES PATENT OFFICE 1,946,318

EDUCATIONAL GAME DEVICE

Eugene B. Hamilton, West Somerville, Mass.

Application April 10, 1931. Serial No. 529,005

1 Claim. (Cl. 35—2)

This invention relates to educational game devices. It provides an interest-stirring device, in the form of a game, which is effective as an aid in the learning and practice of any matter which constitutes the basis of the game. The use of the apparatus involves the player in, first, deciding upon an answer to a problem propounded by the game; second, expressing his answer in the game by making a physical association of selected elements of the apparatus; and, third, it provides a proving system which automatically discloses any error in the work thus done by the pupil-player. One field in which the invention is especially useful is practice in the fundamental operations of arithmetic. The invention is here illustrated as it may be used for drill in learning multiplication.

In a preferred form the invention provides a multiplicity of loose, interchangeable elements, representing questions or problems the answers to which are printed in a fixed distributive arrangement on a board. There may be a key sheet, adapted to be placed in registration with the said fixed arrangement on the board, said key containing proof characters which will register with similar characters on the loose blocks when the blocks have been set into correct spaces on the board, i. e. set in conjunction with proper answers. Any failure of these thus to register together indicates an error, in that the problem block is not located in conjunction with its proper answer.

The question parts of the problems may be expressed by print on little sheets or blocks of thick cardboard, herein for brevity called "blocks"; and the answers may be printed, each beside some one of a multitude of spaces distributed in an orderly way over the board, in any of which spaces any one of the loose blocks may be set. Preferably these spaces will be in the form of receptacles, each adapted to receive and hold a block. The "key" sheet corresponds in size and layout with the answer board, registering as a whole therewith but having holes through which the question blocks are visible, and bearing at the margin of each hole a printed character which will register with a character on the question block if a block proper for that hole is set therein. But there will be no such registration of indicia with a block improperly placed. It is the combination of the three, the board, the block and the key sheet that gives the proof. The mere laying on of the cooperating key or proof sheet reveals whether a particular block has been placed in a right or in a wrong space or receptacle, indicating whether or not the answer arrived at by the player was correct.

In some cases the same answer may be correct for several different questions. The proving device of the invention deals with that situation also; so that the action of the player, in placing the problem block in a position beside what he thinks to be the answer, will be indicated as being correct if put in any one of the several receptacles having the same answer, and incorrect if placed elsewhere.

The apparatus by which these objects are attained is operated in an ordinary case, by the player first removing all of the problem blocks from their answers. Then, selecting one at random, he decides mentally what the answer to its question is, and he looks over the answer board to find the figure or other answer which he has reached; and then he puts the problem block into the receptacle on the answer board which adjoins the place where he finds the answer which he has reached. The application of the proof sheet to the answer board, either immediately or after other answers have been settled upon and their question blocks placed, will show in every individual case whether the player's placement has put the proper question and answer together.

The accompanying drawing illustrates an application of the invention in a simple form, in which it is used for drill in the multiplication of numbers up to twelve.

It is intended that the patent shall cover, by suitable expression in the appended claim, whatever features of patentable novelty are herein disclosed.

Figure 1:
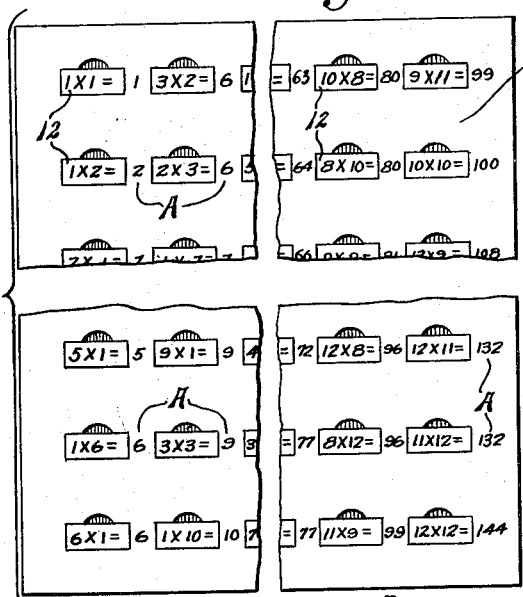
Figure 1 is a plan of a device embodying features of my invention, with portions broken away, and with questions and answers assembled together.
Figure 2:
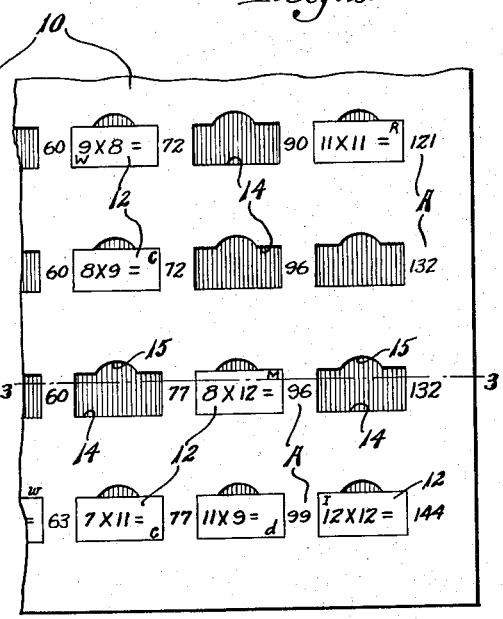
Figure 2 is an enlarged plan of the lower right hand corner of the device of Figure 1, showing some of the question blocks in place and showing vacant receptacles for others.
Figure 4:
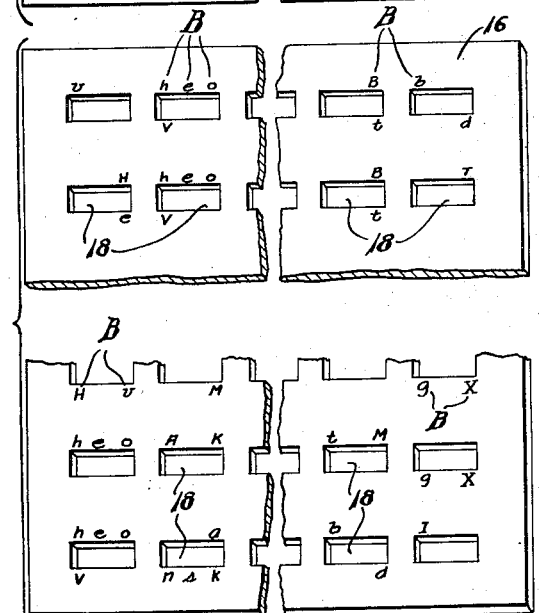
Figure 4 is a perspective of a key or proof sheet for checking the correctness of association of the respective questions and answers, portions being broken away.

Referring to the drawing, the device 10 may be in the convenient board form illustrated, or it may have any of a variety of other forms so long as it presents a surface suitable for reception of the blocks 12, which are adapted to be readily removable, and to be selectively replaced on the board, in the course of use thereof by a child or other person, herein referred to as the "player."

Figure 3:
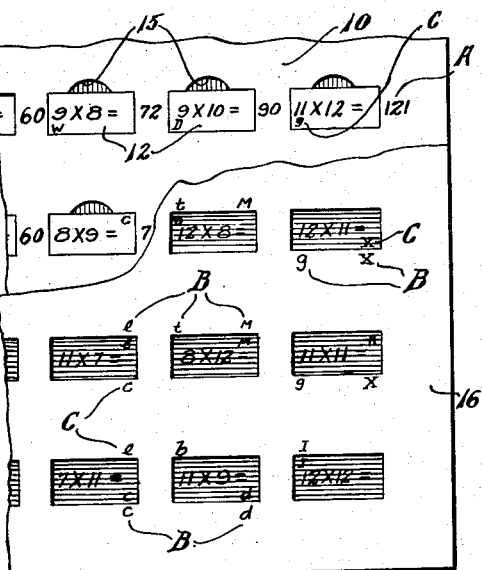
Figure 3 is a section on 3—3 of Figure 2.
Figure 3:
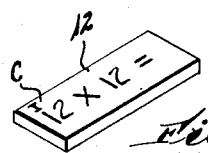
Figure 6:
Figure 6 is a perspective of one of the question blocks, per se.

In the particular embodiment of the invention here selected for representation the board 10 is made up of two plies of cardboard secured together in superposed relation, as seen in Figure 3, the face or upper ply having been preliminarily provided with a multiplicity of oblong holes preferably arranged in rows across and along the board, while the under ply has a continuous intact surface. Thus in the two-ply structure, the surface has a multiplicity of recesses, herein called receptacles 14. The holes in the face ply may be formed by a punch press, or in any other suitable way. Or the receptacles may be formed by pressing indentations into the surface of a board. For convenience in removing the blocks 12, each receptacle may have a notch 15 in one of its side walls for insertion of one's fingertip for a lifting-out engagement with a block 12. The blocks are adapted to sit snugly in the receptacles 14, each block being exactly like every other, and thus capable of fitting any of the whole lot of receptacles 14. The blocks 12 may be of thick cardboard, preferably of single ply. Conveniently they may be the oblong cut-outs removed from board 10. Thus formed they are of size to fit the receptacles 14 and, when in place, lie flush with the board's surface.

When the subject matter to which the invention is applied is to afford practice in the multiplication table, each block-element 12 will bear one of the problems of that table, such as $9 \times 8 =$ , and the board will have an answer number A fixed opposite each receptacle 14, as by being printed there; each such number A constituting the answer to one or more of the problems on the blocks. It is the object to cause the user first to compute a block problem; then to find on the board the answer he has reached; and then to put the particular block 12 whose problem he has solved in any receptacle 14 on board 10 where he finds the number he has reached as his answer. Thus, the block, having the problem, $9 \times 8 =$ , will be correctly located if seated opposite any one of the fixed numbers 72 on the board.

The board 10 may be of size to accommodate as many of the multiplication tables as are desirable. That here shown embodies the tables from 1 through 12, providing 144 of the receptacles 14 and a corresponding number of the fixed answer numbers A. An answer is repeated two, three and even six times, according to the number of problems having the particular answer. Thus the number 20 would stand beside four different receptacles 14 to accommodate the blocks bearing the four combinations, $10 \times 2 =$ , $2 \times 10 =$ , $5 \times 4 =$ and $4 \times 5 =$. Any one of these four blocks can be set at any one of the four imprints 20, and be correctly placed.

In use, all of the loose blocks 12 may first be shuffled together. Then, one at a time, the blocks may be picked up by the player or players for their respective problems to be computed. Having decided upon the answer to one, the player looks over the board 10 and sets the block in a receptacle 14 which stands by that number A which the user has decided is the answer. One, two or a group of persons may play, dividing the shuffled blocks among themselves; and in the game the element of competition may be introduced, if desired, either as to percentage of correct answers or speed of solving.

After all of the blocks 12 have been arranged on the board, or at any intermediate stage, the accuracy of the player's work may be quickly checked by the proof sheet 16. This may be a sheet of cardboard or other suitable material, provided with a multiplicity of holes 18 corresponding in size, shape, number and arrangement with the receptacles 14 on board 10, so that, when overlaid on the board, the blocks 12 are visible through the holes 18. At the margin of each hole 18 on the proof sheet are one or more proof characters, indicated at B, and at the margin of each block 12, there is a proof character indicated at C. If a character on a block 12 registers with a like character at the margin of the hole through which that block is visible, the location of the block is thereby proved to be correct, indicating that the answer to that problem was computed correctly. But if the proof sheet makes no such registration of similar character with the block, this indicates an error in the placing of the block, showing an erroneous computation of the answer to that particular problem.

Figure 5:
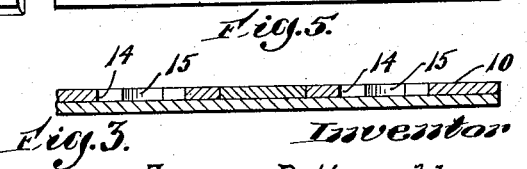
Figure 5 is an enlarged plan of the lower right hand corner of the device of Figure 1 with the proof sheet arranged thereon.

For the cases in which different problems, or problems differently stated, have answers which are identical, there is one receptacle with the identical answer for each block. A proof character appears on each block concerned; and at the margin of every one of the holes in the proof sheet which is associated with this answer the proof characters for all of these blocks are fixed. Thus, there are four blocks each with a problem which has "20" for an answer. And each such block will have a proof character different from the other three and/or positioned differently on the block; and the holes in the proof sheet, through which these blocks are visible, will each have all of the four characters, corresponding to those on the blocks, arranged at its margin in position to register with the characters on the blocks. This is ilustrated in the drawing, Figure 5, in the simple case of the two holes in the middle of the figure, which each have the marginal characters "t" and "M", one of which proves the correctness of the setting of the block "$12 \times 8$", and the other proves the correctness of the setting of the problem "$8 \times 12$". When the proof sheet is put over, one or other of the two characters B at each of these holes on the proof sheet will register with a like character on the block. In this way, despite the plural possibilities as to the location of each block element 12, the player's answer may be checked with instant indication of accuracy or inaccuracy as regards the particular competition.

For illustration of proofing characters B, C, I have chosen to use herein capital and lower case letters of the alphabet; but any suitable characters, symbols, numbers, or marks may serve a similar purpose; and they may operate by similarity of design, of character, or of location on the margin, or both. Also the receptacles 14 need not be recesses or indentations in the board 10 but may be mere spaces; and the term "receptacle" as herein used includes any space whereon a block 12 may be placed and can remain.

The invention provides an interesting and effective device for aiding persons of any age to become proficient in the art of calculation. While it makes an especial appeal to child interest, in teaching multiplication, and may be used with similar effect for addition, subtraction and division, it can be used for higher mathematics, as, for drill in formulæ or factoring; and for other drill, as declensions or irregular verbs in languages, dates and places in history or geography. Indeed the invention has a still broader scope, in that printed questions and answers in general may be the subject. For example, tests, puzzles, and other matter involving association together of part and counterpart; so that it should be understood that the invention is not limited to use with subjects in the form of questions and answers. In the claim however it is convenient to use the terms "problem" and "answer" in a generic sense to cover all such instances of associating part and counterpart.

The board 10 is representative of any suitable playing surface on which the loose blocks 12 may be arranged, on whose surface are fixed the indicia constituting the answer parts of exercises. These answer indicia are stationed singly at fixed locations, being thus distributed in tabular arrangement at a multiplicity of stations on the board; and the plot or space immediately to the left of any station is the place in which a block, bearing the problem part of the exercise to which that answer relates should be set, in order to complete the exercise. The tabular arrangement of the answers facilitates the finding of that particular plot in which any particular block belongs; and the making of a receptacle at that plot facilitates the holding of that block in place until all of the exercises have been completed, so that the proof sheet may then be applied to them all at once.

I claim as my invention:

An educational device comprising a board with a multiplicity of answers fixed distributively thereon, and a multiplicity of loose question-bearing blocks adapted to be arranged on the board according to selection of answer by the player, combined with a proof sheet adapted to be laid over the board and having openings through which all of said arranged blocks are visible simultaneously; each of said blocks having a distinctive character on its margin; and one of said openings having multiple characters on its margin, each corresponding to the character on a different one of diverse blocks of which all have an identical answer, whereby when any one of said diverse blocks is set to appear in said opening, its character will register with a like character on the margin of said opening.

EUGENE B. HAMILTON.